(12) United States Patent
Leenstra et al.

(10) Patent No.: US 7,783,690 B2
(45) Date of Patent: Aug. 24, 2010

(54) ELECTRONIC CIRCUIT FOR IMPLEMENTING A PERMUTATION OPERATION

(75) Inventors: Jens Leenstra, Bondorf (DE); Nicolas Maeding, Holzgerlingen (DE); Amaury Neve de Mevergnies, Linkebeek (BE); Hans-Werner Tast, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 1125 days.

(21) Appl. No.: 11/390,791

(22) Filed: Mar. 28, 2006

(65) Prior Publication Data
US 2007/0011220 A1    Jan. 11, 2007

(30) Foreign Application Priority Data
Jul. 7, 2005    (DE) .................................... 051 06 210

(51) Int. Cl.
*G06F 15/00* (2006.01)

(52) U.S. Cl. ...................................................... 708/200
(58) Field of Classification Search ................... 708/200
See application file for complete search history.

(56) References Cited

U.S. PATENT DOCUMENTS

| | | | |
|---|---|---|---|
| 6,381,690 B1* | 4/2002 | Lee | 712/223 |
| 2004/0054879 A1 | 3/2004 | Macy, Jr. et al. | |
| 2005/0149590 A1* | 7/2005 | Lee et al. | 708/200 |
| 2006/0095485 A1* | 5/2006 | Moore | 708/200 |

* cited by examiner

*Primary Examiner*—Tan V Mai
(74) *Attorney, Agent, or Firm*—Dillon & Yudell LLP

(57) ABSTRACT

A crossbar (20) circuit with multiplexer (22A, 22B) circuits implemented in a polygonal form on a chip. The crossbar can be used for implementing a permutation of input bits (24A, 24B) controlled by a bit vector (25). Horizontal and vertical wiring lengths in the crossbar (20) are reduced by stacking the operand latches (24A, 24B, 25) and horizontal or vertical multiplexers (22A, 22B). This implementation decreases the latency of the crossbar and avoids latches to store intermediated results, thus reducing area and power consumption.

15 Claims, 2 Drawing Sheets

- - - - worst case data flow
........... control
———— best case data flow

ELECTRONIC CIRCUIT FOR IMPLEMENTING A PERMUTATION OPERATION

FIELD OF THE INVENTION

The present invention lies within the field of computer hardware and in particular of chip macro design. It relates to an electronic computing circuit for implementing a permutation operation between for a plurality of M input bits controlled by a control vector of a plurality of C control bits, which is implemented in a polygonal form on a chip.

DESCRIPTION OF PRIOR ART

Under the term "permutation operation" a function shall be understood which generates an output bit vector dependent of an input vector, and which in its most general scope enables an output set of bits to be generated from a respective input bit setting. In contrast to rotation and shift operations the output bits can be generated by a mapping from the input bits without any regularity or similarity between both vectors, when a vector is seen as a whole. A set of input bits may comprise a number of 1 bit, 2 bits, . . . bits, for example, 9 bits (1 byte+parity bit) may be used. Here, we exemplarily use sets of 8 bits, building together one byte, respectively, without delimiting the disclosure. Of course, this operation can be extended to be done in half-bytes, or other multiples of one bit. The selection of an input vector element is determined by a control vector, with a tuneable selection granularity, the details of which are described with reference to FIG. 1.

FIG. 1 represents a prior art way to implement a crossbar macro 10. US Patent application US2004/0054879 A1 discloses a table-lookup application for such crossbar implementation without describing details of the architectural design.

The height of the crossbar is defined throughout the current disclosure in vertical y-direction of the figure, the width in horizontal x-direction. Let O be the number of operands, S be the number of words of each operand, and W be the number of bits in a word, which are controlled by a single control bit of the control vector C.

The crossbar implementation illustrated by way of example in FIG. 1 for a 2*16-byte case, processes two input operands A and B, each of A and B comprising a 16-bytes bit length and generating a result vector of 16 bytes length in a control granularity of 8 bits. Thus, M is O*S*W=2*16*8=256 bits. N is 1*16*8=128 bits. With a control granularity of W=8 bits a single control bit of control vector C controls W=8 bits concurrently. The control vector has a width of S*log 2 O*S=16*5=80.

The A and B operands as well as the control vector C come out of latches 14 that are physically situated at one side of the polygon of the crossbar macro 10, in FIG. 1 they are depicted at the top edge of the macro 10. The A and B operands are located in a stacked form in the input latches 14 for being input into the multiplexer logic. Thus, in the most left input latch the bits A0, B0 are stacked, in the most right bit latch A127, and B127. The input bit latches of control vector C are spread, such that a number of 5 control bits are arranged in groups adjacent to a byte of data in A and B.

The crossbar macro 10 basically is composed of a plurality of multiplexers, which are in total depicted as block 12. The multiplexers 12 have to select the bytes from operands A and B, which are to be passed through to an output latch arrangement 16. Thus, these multiplexers 12 determine from which position each output byte is coming, based on the control vector. The overall crossbar structure is a regular arrangement of S=16 independent multiplexers.

Imposed by the increasing tendency to continued shrinking of macro implementations, the semiconductor chip wiring and signal runtime thereon must be optimized correspondingly in an increasing manner, as the more a wire cross-section shrinks, the worse becomes its RC resistance. As the clock cycles get shorter in parallel, wire optimization tends to be a must in general, but in particular in circuits like multiplexers 12, as this circuit has considerable lateral dimensions both in X and Y direction.

Thus, the wiring and in particular the wiring length is an increasingly important design issue in such multiplexer macro structure. In the best case, which is depicted as permanent-type line, the byte comes out of a latch situated in the middle of the crossbar 12, and runs on an equal length to the left and to the right. This configuration has involved minimal horizontal wiring. The disadvantage of this prior art is that only very few bytes benefit from this optimal position. In the classical prior art example, only 2 bytes per operand can use the optimal position. In the worst case, the byte is starting from the extreme left, or extreme right position, respectively and has to travel across the total height, before running along the entire length on a horizontal wire (shown as a broken line in FIG. 1) and through several MUX stages. Even though the vertical wire can be between the several MUX stages as well, this adds up to same vertical wire length.

The control signals wiring has a similar problem: they have a large fan-out (equals W) and must be distributed along the entire height of the crossbar, which is represented as a dotted line in FIG. 1. The straight-forward way how to manage such situations is certainly to split up the crossbar operations and to execute them in more than one cycle. But this increases significantly the amount of latches in the design and impacts disadvantageously macro area, power consumption and timing.

OBJECTIVES OF THE INVENTION

It is thus an objective of the present invention to provide a crossbar implementation with reduced horizontal and vertical wire length of the built-in multiplexers.

SUMMARY OF THE INVENTION

This objective of the invention is achieved by the features stated in enclosed independent claims. Further advantageous arrangements and embodiments of the invention are set forth in the respective dependent claims. Reference should now be made to the appended claims.

In the present invention various implementations of a crossbar circuit are disclosed which reduce the length of the horizontal and/or vertical wires. This is particularly advantageous, when an architectural constraint is present which requires producing the crossbar output in a single-clock cycle or less, without intermediate latches other than the operand latches and the result latches.

On the other hand the present invention includes embodiments not explicitly described in more detail, which may implement intermediate latches motivated by any other reasons. Those embodiments just do not exploit the full degree of signal path optimization, but may be useful in any other technical regard.

According to the broadest aspect of the invention it is disclosed to provide a) two separate input register sets for said input bits being arranged at opposite sides of the polygonal macro crossbar circuit, wherein the input bits can be freely assigned to a plurality of O=2, 3, . . . , N_op operands, wherein b) an output register set is arranged in a central region of said polygon, c) a first multiplexer set is connected to the first input register set for selecting bits there from and extends from a respective first outer region of the circuit to the central region, d) a second multiplexer set is connected to the second input register set for selecting bits there from and extends from a respective second outer region of the circuit to the central region, and e) a third multiplexer's inputs are connected to the outputs of said first and second multiplexer sets for selecting bits there from and said third multiplexer's output is connected to the output register set.

Advantageously, the third multiplexer is arranged as close as possible to the output register set.

The permutation is controlled by a control vector C. Each bit thereof may control a group of a plurality of W bits concurrently. If W=8, then the permutation is controlled on a byte wise level. The control vector C is divided in a number of S (S=16 in the case of FIG. 2) subvectors, wherein each subvector controls one MUX "slice". Each subvector contains log 2 (O*S) bits (5 bits in the example of FIG. 2). Each control bit controls W multiplexers of log 2 (O*S) levels within a respective MUX slice.

Preferred are cases, where N_op is an equal number N_op=2, 4, 6, 8, . . . as the implementation of the crossbar will be quite symmetric, as a number of N_op/2 is evaluated from top to center (in FIG. 2) and the other half from bottom to center.

Further preferably, each of above mentioned multiplexer sets is connected to a respective input of at least one N_op:1 multiplexer or a respective group of a multiplexer plus a subsequent multiplexer, for selecting between one of said N_op sets of input bits.

The detailed embodiment described later shows two input operands A and B, thus, N_op equals 2, and there is a single 2:1 MUX, which output is connected to the result register (output register) set.

Using this inventional approach a classical permutation of the input bit setting can be performed, regardless from where the input bits originate, what they encode, etc.

Of course, the inventional concept can be applied to other forms of multiplexing, for example a 3:1, a 4:1 multiplexer, etc., as in general, the inventional approach means to take into account the importance of wire delay during development. Base of this design technique is that the total wire is distributed over functional cycles and reduced in the function-critical part of the design. While doing so the focus is to minimize the horizontal and vertical wire length while keeping in mind the complexity of the function.

A vertical multiplexer, for example a 32:1 MUX, fitting in 1 bit slice, is implemented for each output bit. Preferably, this vertical multiplexer is divided in three parts combined with the input/output latch arrangement as described next in the preferred embodiments, i.e., the A operand placed on top, the B placed on the bottom and the result and control latch placed at the center. This arrangement aims at reducing the length of the vertical wires.

A second feature discloses a "folding" of the input latches in order to reduce the horizontal wiring length. This can be applied byte-wise or bit-wise. In the optimum case, all the data signals originate from the center of the crossbar. By stacking the operand latches, the horizontal wiring length can thus be reduced. By stacking 2 latch rows, the wiring length is reduced to 3/4 of the crossbar width; by stacking 4 rows of latches, the horizontal wiring length is reduced to 5/8 of the total crossbar with. Since the vertical wiring length increases with the amount of latch rows that are stacked, an optimum can be found where the decrease of the horizontal wiring length and the increase of the vertical wiring length result in a total, i.e., horizontal and vertical minimum wiring length. The amount of horizontal wire tracks needed is not changed by the folding.

BRIEF DESCRIPTION OF THE DRAWINGS

The present invention is illustrated by way of example and is not limited by the shape of the figures of the drawings in which.

DETAILED DESCRIPTION

Figure 1:
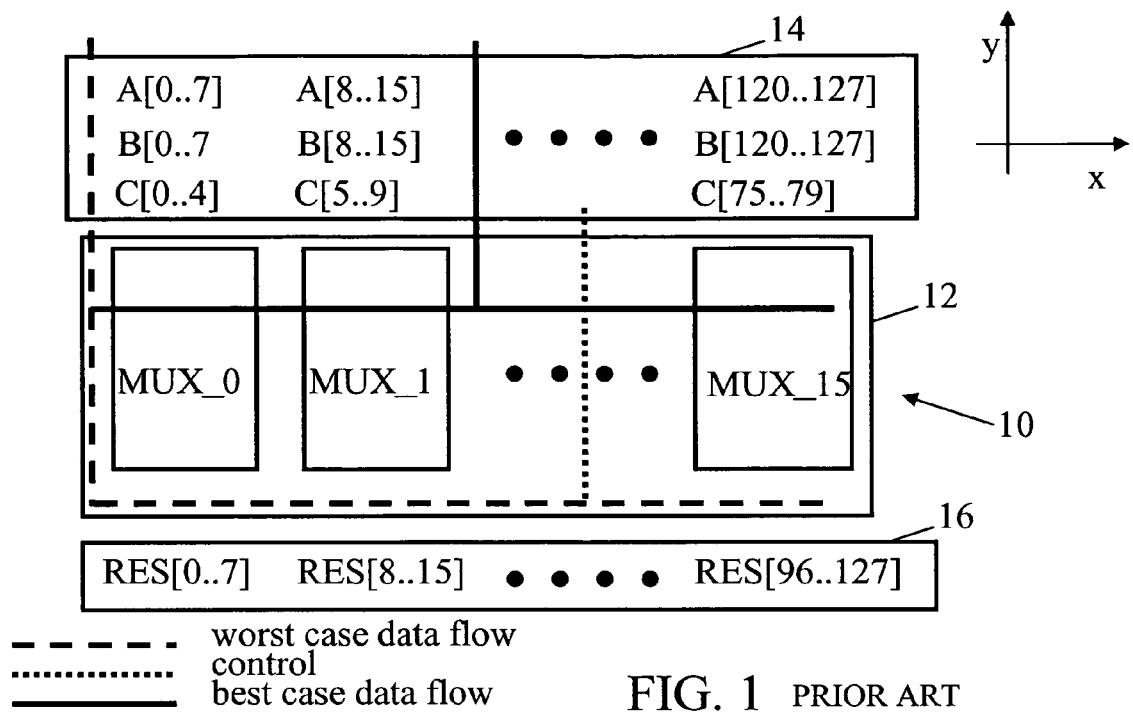
FIG. 1 is a schematic block diagram illustrating a prior art crossbar implementation in a rough macro view.

With general reference to the figures and with special reference now to FIG. 2, a first embodiment of the invention comprising a 2*16-byte input (for operand A and B), 16-byte output crossbar implementation is described next in more detail. Where applicable in an obvious way the introductory description of FIG. 1 can be applied also in the rest of the figures.

The crossbar implementation denoted with reference sign 20 as a whole, has still a rectangle form and comprises two separate input register sets 24A and 24B, which are arranged at opposite margins of the rectangle. There are two separate multiplexer sections 22A and 22B for operand A and B, respectively, comprising a 32:1 multiplexer per output bit, details see in FIG. 3.

Figure 2:
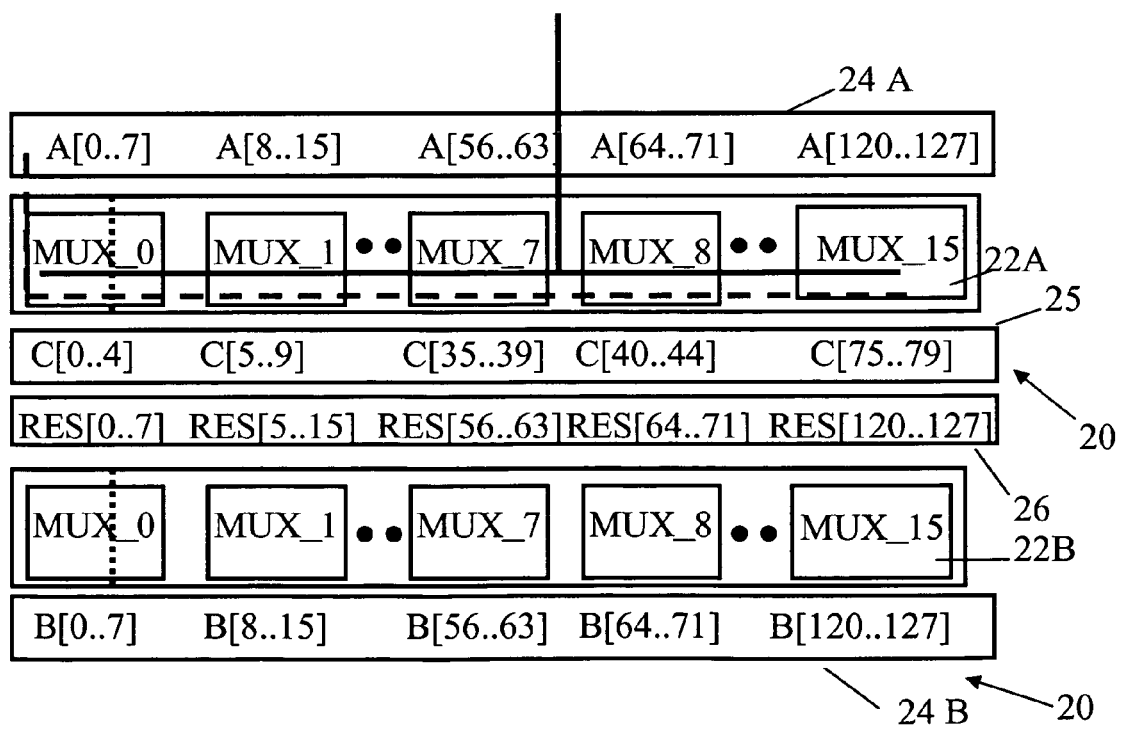
FIG. 2 is a schematic block diagram illustrating a crossbar implementation in a rough physical view according to a first embodiment of the invention.

The register set for the control vector and that of the result vector 26 are arranged in the middle of the crossbar, together with a last 2:1 multiplexer—provided per output bit—which is implemented as a MUX "slice"—vertical in FIG. 2 and not depicted in order to improve clarity of the drawing—in a distributed form around the control register set 25 thus building a joining connection of the before-mentioned multiplexer sections 22A, 22B. This multiplexer set is denoted as "third" multiplexer set in the appended claims.

A multiplexer slice of this third multiplexer set comprises preferably three NAND gates.

Operands A and B are 16 bytes large. The control vector C depicted with reference sign 25 is composed of 80 bits. For each output byte, 5 of these control bits are used to control the multiplexers 22A and 22B. 1 bit selects A or B operand, 4 bits select one of the 16 bytes of the selected operand.

As a skilled reader may appreciate, this first embodiment is used to reduce the length of the vertical wires in the crossbar implementation. According to this embodiment the placement of the latches for input register set for operands A, B, C and that of the result is changed compared to the prior art implementation of FIG. 1.

Further, in each section 22A and 22B a vertical 16:1 multiplexer is introduced. The operand latches 24A for operand A thus are placed at the top of the crossbar 20, whereas the operand latches for B are placed to the bottom of the macro and the result latches are now placed in the middle of the crossbar together with a 2:1 multiplexer which inputs are driven by 22A and 22B respectively.

Figure 3:
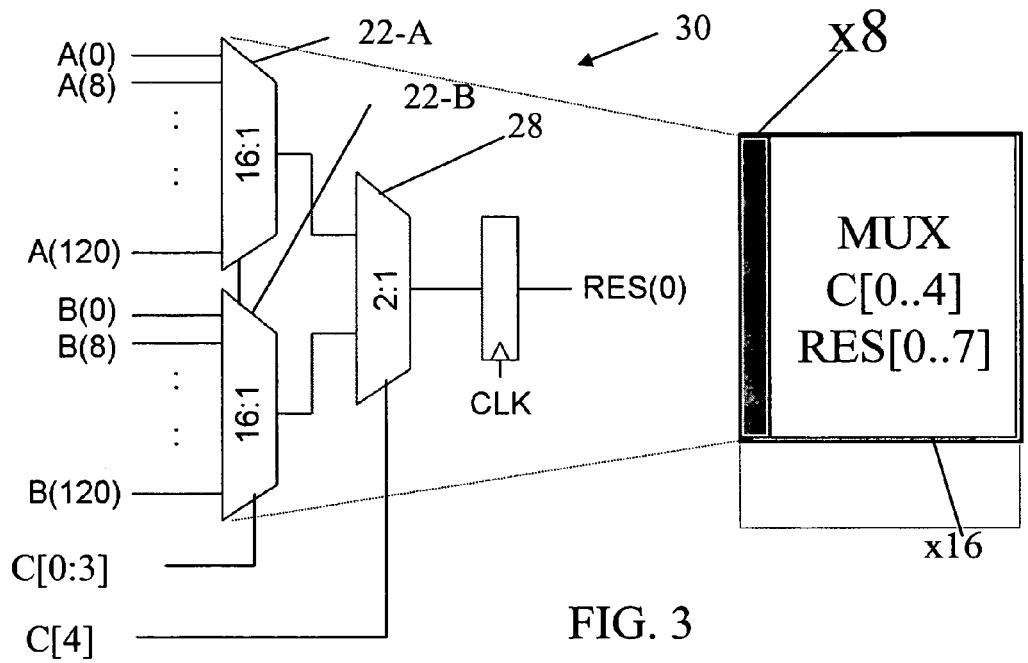
FIG. 3 is schematic block diagram of the circuit of FIG. 2 in logical view.

There is one vertical 32:1 multiplexer 30 per output bit, which is shown only in FIG. 3 in order to increase the clarity of FIG. 2. The multiplexer 30 is composed of three parts. First, the 16:1 multiplexer 22-A is provided which selects the A operand in the top part, in the bottom part there is a second 16:1 multiplexer 22-B selecting the B-operand, and finally the before-mentioned third 2:1 multiplexer 28 selects which one from A or B is the final result.

The output of this 2:1 multiplexer 28 is input directly into the result latch. The vertical data wires length is reduced since the data has to travel only one half of the crossbar height in the worst case. This is achieved due to the placement of the A and B operand latches at the top and the bottom of the crossbar, respectively. The vertical output wire is minimal thanks to the fact that the last 2:1 multiplexer 28 is placed in close vicinity of the output latch 26.

Of course additional wiring for one operand (here operand B) of about the crossbar height relative to prior art is needed, if the both input operands come from the same direction, e.g., from the top of FIG. 2. This is, however in most cases not harmful as to processing time as the signals for B for example can be fed to the input register set in the previous cycle before entering the crossbar implementation. In addition the height of the crossbar is wire-dominated and each portion has about half the height of a prior art implementation. In total the height of the crossbar is equal.

Figure 4:
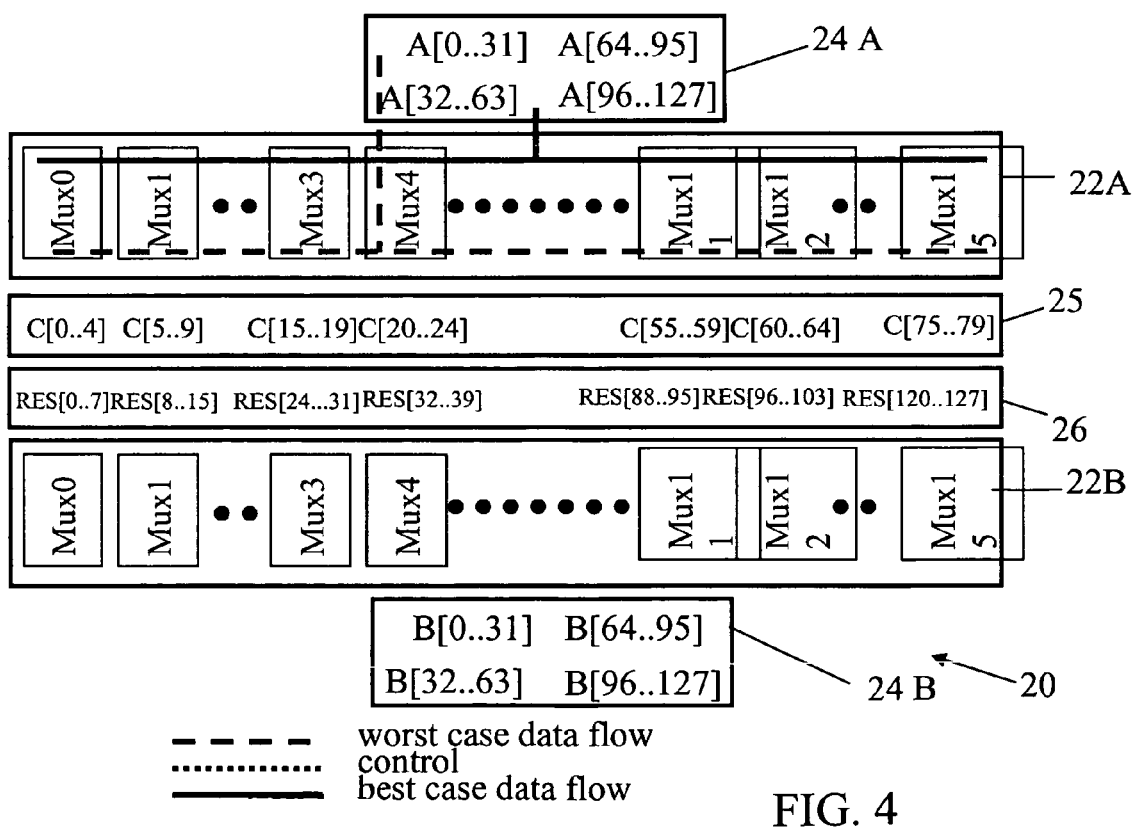
FIG. 4 is a schematic block diagram illustrating a crossbar implementation in a rough physical view according to a second embodiment of the invention.

With reference to FIG. 4, a second embodiment of the invention is described, which is aimed to obtain additionally a reduction of the length of the horizontal wires. This second embodiment includes the features of the first embodiment and introduces some new feature on-top. Of course, these new features can also be implemented in a crossbar implementation according to prior art FIG. 1.

The width (horizontal direction in FIG. 4) of the crossbar is determined by the amount of vertical 32-bit multiplexers 30, and thus by the width of the output vector. In this exemplary embodiment, there are a number of 128 vertical 32:1 multiplexers 30. In the ideal case, the operands should enter in the center of the crossbar implementation in order to travel the minimum length, i.e. half of the crossbar width. This optimal case can be approximated, if the operand latches are stacked. This is proposed as the basic on-top feature.

In the actual example of FIG. 4, a stack height of two is chosen for the input A latches 24A. For the A-operand, the latches for bytes 0 to 3, i.e., A[0 . . . 31], are stacked above the latches for bytes 4 to 7, i.e. A[32 . . . 63]. The latches for bytes 12 to 15 (A[96 . . . 127]) are stacked above the latches for bytes 8 to 11 (A[64 . . . 95]). The same principle is applied for the B-operand latches 24B. An implementation of this feature involves certain, but tolerable increase of the vertical wire length by the height of one latch row and an increased vertical wire channel usage.

Further, in order to ensure a proper signal transmission across the crossbar, inverters are placed at the center of each 4-byte crossbar "slice" for regeneration of the signal. Note that in the worst case three regenerating inverters are needed. Depending of the used chip technology the amount of inverters may vary.

In the worst case, the signal must travel ¾ of the crossbar width, instead of the entire crossbar width in the classical case.

The before-described disclosure of the two embodiments can be varied in a number of architectural design issues, such as bit length of operands, number of operands, and stack height. For example, in order to come nearer to the optimum wire length, further stacking of the operand latches can be used. If a stacking height of 4 is applied, the latches for byte 0 to 3, 4 to 7, 8 to 11 and 12 to 15 can be stacked. The worst case signal run in this case is ⅝ of the total crossbar width. Depending on the height of the available latches, an optimum can be found, balancing the reduction of horizontal wire length and the increase of the vertical wire length due to the stacking of the latches. This configuration enables to have maximum two regenerating inverters on the signal path, thus having a positive impact on the delay.

The invention claimed is:

1. An electronic computing circuit for implementing a permutation operation for a plurality of M input bits, said circuit comprising:
   a) two separate input register sets for receiving said plurality of M input bits, where the two input register sets includes a first input register set and a second input register set which are arranged at opposite sides of a macro crossbar circuit arranged in a polygonal form on a chip;
   b) an output register set arranged in a central region of said polygonal form;
   c) a first multiplexer set connected to the first input register set for selecting bits there from, wherein said first multiplexer set extends from a respective first outer region of said polygonal form to the central region of said polygonal form,
   d) a second multiplexer set connected to the second input register set for selecting bits there from, wherein said second multiplexer set extends from a respective second outer region of said polygonal form to the central region of said polygonal form; and
   e) a third multiplexer, with inputs connected to the outputs of said first and second multiplexer sets for selecting bits therefrom, wherein an output of said third multiplexer is connected to said output register set.

2. The electronic computing circuit according to claim 1, wherein said third multiplexer set is arranged adjacent to said output register set.

3. An electronic computing circuit according to claim 2, wherein the input registers are stacked in stacks of a predetermined height.

4. An electronic computing circuit according to claim 3, wherein the stack height is 2.

5. An electronic computing circuit according to claim 2, further comprising a control vector of a plurality of C control bits which controls the permutation operation for the plurality of M input bits, wherein a bit of said control vector controls a group of a plurality of W bits, wherein W is an integer number greater than or equal 1.

6. An electronic computing circuit according to claim 5, wherein W is equal to 8.

7. The electronic computing circuit of claim 5, wherein the control vector is further divided into a plurality of subvectors, which each control a respective MUX slice.

8. The electronic computing circuit according to claim 1, wherein the input bits are assigned to a plurality of O=2, 3, . . . , N_op operands.

9. The electronic computing circuit of claim 8, wherein N_op is an integer multiple of two (2) and the crossbar circuit is implemented in a symmetric manner with one half the number of N_op evaluated from top to center of the polygonal form and a second half of the N-ops are evaluated from the bottom to center of the polygonal form.

10. An electronic computing circuit according to claim 1, wherein the first and the second input register sets are stacked in stacks of a predetermined height.

11. An electronic computing circuit according to claim 10, wherein the stack height is 2.

12. An electronic computing circuit according to claim 1, further comprising a control vector of a plurality of C control bits which controls the permutation operation for the plurality of M input bits, wherein a bit of said control vector controls a group of a plurality of W bits, wherein W is an integer number greater than or equal 1.

13. An electronic computing circuit according to claim 12, wherein W is equal to 8.

14. An integrated circuit chip having manufactured thereon the electronic computing circuit of claim 1.

15. The electronic computing circuit of claim 1, wherein the polygonal form reduces an amount of vertical wire required in the circuit and wherein further, folding is applied to one or more of the input latches to reduce a horizontal wiring length and stacking operand latches, wherein a smaller quantity/length of wiring is utilized because of the polygonal form and stacking functions.

* * * * *